(12) United States Patent
Hou et al.

(10) Patent No.: US 12,444,177 B2
(45) Date of Patent: Oct. 14, 2025

(54) AR-ASSISTED SYNTHETIC DATA GENERATION FOR TRAINING MACHINE LEARNING MODELS

(71) Applicant: Google LLC, Mountain View, CA (US)

(72) Inventors: Tingbo Hou, Santa Clara, CA (US); Jianing Wei, Cupertino, CA (US); Adel Ahmadyan, Mountain View, CA (US); Matthias Grundmann, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 735 days.

(21) Appl. No.: 17/778,085

(22) PCT Filed: Nov. 19, 2019

(86) PCT No.: PCT/US2019/062218
§ 371 (c)(1),
(2) Date: May 19, 2022

(87) PCT Pub. No.: WO2021/101527
PCT Pub. Date: May 27, 2021

(65) Prior Publication Data
US 2022/0415030 A1 Dec. 29, 2022

(51) Int. Cl.
*G06V 10/774* (2022.01)
*G06V 20/64* (2022.01)

(52) U.S. Cl.
CPC ......... *G06V 10/7747* (2022.01); *G06V 20/64* (2022.01)

(58) Field of Classification Search
CPC .... G06V 10/7747; G06V 20/64; G06N 3/084; G06T 11/00
See application file for complete search history.

(56) References Cited

U.S. PATENT DOCUMENTS

| | | |
|---|---|---|
| 9,972,137 B2 * | 5/2018 | Petrovskaya ............ G02B 7/36 |
| 2017/0214899 A1 | 7/2017 | Meier et al. |
| 2019/0130219 A1 * | 5/2019 | Shreve .................. G06T 19/006 |

(Continued)

FOREIGN PATENT DOCUMENTS

WO WO 2019/113510 6/2019

OTHER PUBLICATIONS

International Preliminary Report on Patentability for PCT/US2019/062218, mailed on Jun. 2, 2022, 12 pages.

(Continued)

*Primary Examiner* — John Villecco
*Assistant Examiner* — Han Hoang
(74) *Attorney, Agent, or Firm* — DORITY & MANNING P.A.

(57) ABSTRACT

The present disclosure is directed to systems and methods for generating synthetic training data using augmented reality (AR) techniques. For example, images of a scene can be used to generate a three-dimensional mapping of the scene. The three-dimensional mapping may be associated with the images to indicate locations for positioning a virtual object. Using an AR rendering engine, implementations can generate an and orientation. The augmented image can then be stored in a machine learning dataset and associated with a label based on aspects of the virtual object.

20 Claims, 8 Drawing Sheets

(56) References Cited

U.S. PATENT DOCUMENTS

2021/0019036 A1\* 1/2021 Wang .................... G06F 3/0346
2021/0122035 A1\* 4/2021 Furlan ..................... G06N 3/04

OTHER PUBLICATIONS

International Search Report and Written Opinion for PCT/US2019/062218, mailed on Aug. 6, 2020, 16 pages.
Martin et al., "Towards Learning 3d Object Detection and 6d Pose Estimation from Synthetic Data", 2019 International Conference on Emerging Technologies and Factory Automation, Sep. 10-13, 2019, Zaragoza, Spain, pp. 1540-1543.
Wang et al., "Normalized Object Coordinate Space for Category—Level 6D Object Pose and Size Estimation", Conference on Computer Vision and Pattern Recognition, Jun. 16-20, 2019, Long Beach, California, United States, pp. 2637-2646.

\* cited by examiner

AR-ASSISTED SYNTHETIC DATA GENERATION FOR TRAINING MACHINE LEARNING MODELS

PRIORITY CLAIM

This application is based upon and claims the right of priority under 35 U.S.C. § 371 to International Application No. PCT/US2019/062218 filed on Nov. 19, 2019, which is incorporated by reference herein in its entirety.

FIELD

The present disclosure relates generally to machine learning. More particularly, the present disclosure relates to computer-implemented systems and methods which can generate synthetic data from three-dimensional imagery such as augmented reality mapped environments and/or virtual objects. Aspects of the present disclosure can further include using the synthetic data for training machine learned models.

BACKGROUND

Machine learning algorithms rely on data to learn patterns from images. However, collecting and labeling real data can be both expensive and time-consuming. As a result, it may be more economical and scalable to generate synthetic images rather than collecting and annotating real images. Typical techniques for generating synthetic images result in synthetic images that are of lower quality and "realism" relative to real world imagery (e.g., the synthetic images look "fake"). Because machine learning techniques are reliant upon training data, the use of unrealistic synthetic images can cause machine learning models trained on such synthetic images to exhibit poorer performance relative to those trained on real imagery. Therefore, generating photorealistic synthetic images that better approximate real world imagery is highly desirable. Needed still are methods in the art for synthetic data generation for applications such as machine learning.

SUMMARY

The present disclosure is directed to systems and methods for generating synthetic training data using augmented reality (AR) techniques. For example, images of a scene can be used to generate a three-dimensional mapping of the scene. The three-dimensional mapping may be associated with the images to indicate locations for positioning a virtual object. Using an AR rendering engine, implementations can generate an augmented image depicting the virtual object within the scene at a position and orientation. The augmented image can then be stored in a machine learning dataset and associated with a label based on aspects of the virtual object.

In this manner, training data that includes heavily dense scenes with large numbers of objects having varying sizes may be generated quickly at low costs. Further, the augmented images can be automatically labeled using example systems and methods to indicate the object position such as coordinate locations of bounding box edges. Other features such as an object name may also be used to label augmented images. Alternatively or additionally, the augmented image as a whole may be assigned a label to indicate properties such as image realism or conformance with natural laws such as gravity.

BRIEF DESCRIPTION OF THE DRAWINGS

Detailed discussion of embodiments directed to one of ordinary skill in the art is set forth in the specification, which makes reference to the appended figures, in which:

FIG. 6B shows example bounding boxes for the virtual objects included in the example augmented images of FIG. 6A; FIG. 6C shows example depth and segmentation masks for the virtual objects included in the example augmented images of FIG. 6A; and FIG. 6D shows example visibility masks for the virtual objects included in the example augmented images of FIG. 6A.

Figure 1:
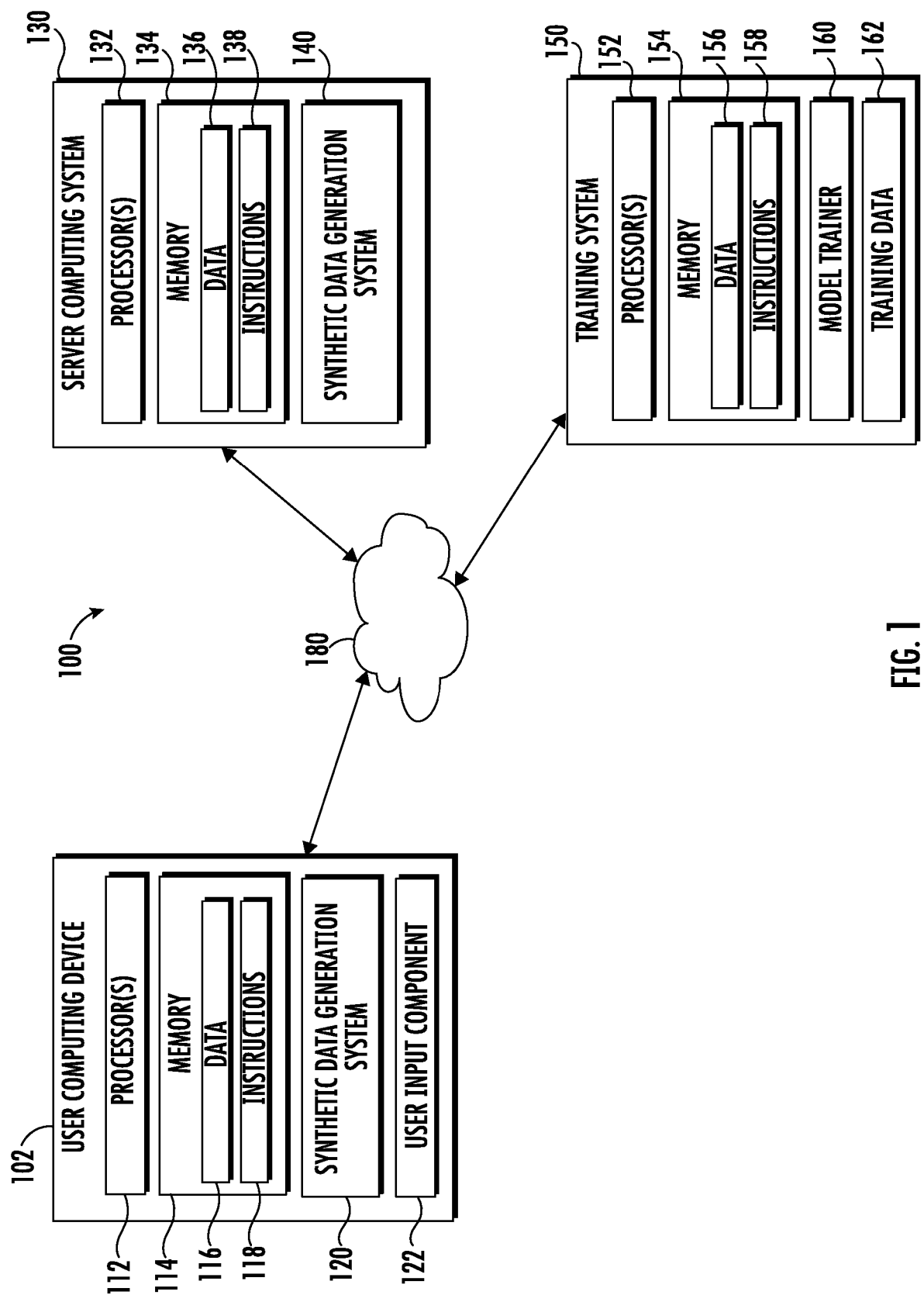
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods for generating synthetic training data for machine-learned models as well as using the synthetic training data to train machine-learned models. Aspects of example systems and methods can include automated labeling of the synthetic training data to streamline training machine-learned models using supervised learning techniques.

As one example, computer vision models provide a machine learning tool for interpreting a three-dimensional (3D) environment for uses such as object detection and classification. To classify an object in a scene can require a model to not only understand what features of an object can be used to identify it with high confidence but also to search the scene for regions to use for classification or areas that may be obscured due to other imagery. Thus, training computer vision models can require larger and more complex labeling when compared to other machine learned models.

Example implementations of the disclosure can use augmented reality (AR) techniques to generate synthetic training data. Generating the synthetic training data can include obtaining a virtual object such as a 3D model of a real object (e.g., a shoe) and positioning the virtual object in an augmented reality scene (AR scene). The AR scene can be understood as including one or more image frames depicting a physical location that can be associated with more detailed information about the 3D environment of the location such as depth. This information can be derived solely from the imagery using an AR engine or can be generated based on one or more of: the camera pose (e.g., camera position and orientation), lighting, or other sensor data (e.g., depth sensor data) that can be used to generate a point-cloud or mesh grid of physical items or surfaces within the scene. The AR scene and the virtual object can be combined to produce synthetic training data by utilizing AR technology to augment one or more image frames that depict the scene, thereby generating an augmented image displaying at least a portion of the virtual object at a location in the scene.

Example advantages of the present disclosure include automated labeling of synthetic training data. For instance, the augmented image can further be stored as a training image within a machine learning training dataset. Implementations can also associate a training label with the training image in the machine learning dataset, the label indicating one or more of: identifies the virtual object (e.g., a shoe, a vase, or a camera), indicates the position of the virtual object (e.g., a coordinate point in the AR scene or an area in the augmented image), or indicates the orientation of the virtual object within the scene (e.g., an angle based on a reference frame).

For implementations of the disclosure, the training object can be described by a virtual model. Virtual models can be constructed, for example, by 3D scanners or multi-camera systems that can stitch together images to create a volume representing the object including features such as size, shape, color, or other physical attributes. By combining the virtual model of the physical object with data including one or more image frames that depict a scene (e.g., an AR scene), an augmented image and/or a virtual scene can be generated for training machine-learned models (e.g., computer vision models). Machine-learned models trained on a dataset that includes such augmented images/virtual scenes may exhibit higher performance relative to those trained on synthetic imagery or a smaller training set of manually labelled images/scenes.

Further, the augmented image can include or otherwise be associated with one or more labels defining ground truth aspects of the virtual object (e.g., position within the AR scene, orientation relative to a camera, contact area(s), etc.) and/or the AR scene (e.g., camera position, depth information, coordinate locations, etc.) that can be used in subsequently training a computer vision or other machine learned model. In this manner, both data generation and labeling can be streamlined using implementations according to the present disclosure, which may provide advantages in reducing costs and/or improving data diversity.

While certain techniques can generate additional training data using data-augmentation, implementations of the present disclosure focus on generation of high-quality data by taking advantage of the control, precision, and realism provided by AR rendering engines and environments. Further, disclosed implementations can leverage the data associated with the virtual object and/or the virtual environment to automatically produce labeled training data.

One example of obtaining data of a scene in augmented reality may include utilizing a device to capture one or more video sequences of a scene (e.g., a session). In some cases, the device can include a personal device such as a smartphone that includes an AR engine configured for AR generation (e.g., ARKit or ARCore). The AR engine can be configured to estimate features and planes with 3D coordinates, as well as lighting of the scene. During the session, a world frame can be defined depending on one or more configurations. For example, a gravity configuration can include 3 axes: a y-axis pointed up, parallel to gravity, a z-axis pointing outward from the screen (or normal to the camera), and an x-axis perpendicular to both the y-axis and z-axis. In some cases, an origin can be defined as the initial position of the device during the session. In general, the AR session data can be used to construct an AR scene using a suitable AR engine and/or application.

Further, the AR session data may include one or more image frames that depict a scene. The one or more image frames may depict the scene from various positions and/or camera angles that together can be used to generate a mapping of the scene including objects and or surfaces depicted in the scene. In some cases, the image frames may be associated with depth data that can be also be used in generating the mapping of the scene.

While certain implementations can include obtaining the AR session data using an AR device, alternative implementations may access saved AR session data or may access video data which includes one or more image frames and/or other sensor data that together have sufficient information for generating an AR view of a scene. Thus, generally implementations according to the present disclosure can include obtaining data that comprises one or more image frames that depict a scene.

In addition to obtaining data of a scene in AR, implementations of the disclosure can include obtaining a three-dimensional model of an object (e.g., a virtual object). Techniques for obtaining the virtual object can include object scanning, multi-view cameras, or other image stitching methods to generate a substantially accurate representation of the object in 3D. A model of a virtual object can also be accessed from a database.

After obtaining the data of a scene in augmented reality and a three-dimensional model of a virtual object, a reference frame can be determined for placing the model in the AR scene. For example, a reference frame can include defining one or more seats that represent possible planar regions on the exterior of the virtual object for positioning the virtual object in the AR scene. Generally, the planar regions do not need to be on or in contact with the virtual object and may be understood as representing a hypothetical volume encompassing the virtual object or a region of the hypothetical volume.

As an example, the one or more seats can together define a bounding box having a rectangular volume that encapsulates the entirety of the virtual object. Each face of the rectangular volume can be considered one seat (6 seats total) for positioning the object in the AR scene. In some cases, further seats can be included. For instance, certain objects may be better defined by volumes composed of 10 or more planar faces which may provide greater control in placing objects that include curved surfaces. Alternatively, in certain implementations the number of seats may be limited (e.g., 1 seat total) to indicate a correct or preferred orientation for the virtual object.

In some implementations of the disclosure, the one or more seats may be used to define an orientation axis. For example, the augmented image can depict one or more instances of the virtual object within the scene. In positioning the virtual object(s) within the scene, a seat can be chosen (e.g., at random, based on an input, otherwise encoded in hardware and/or software, etc.). The seat can describe a bottom region for the virtual object, thus setting a first orientation. A second orientation can be determined by rotating the virtual object about the axis normal to the seat. As an example for illustration, if a virtual object were to be placed on the ground in the AR scene, the seat would be in contact with the ground and the virtual object could be rotated around the direction of gravity to yield various second orientations.

Aspects of placing the virtual object in the AR scene may include determining the seat, the orientation, and/or the position within the AR scene. As discussed, in some implementations, each attribute can be determined at random (e.g., using a random number generator). Alternatively, for certain implementations some or all of the attributes can be selected prior to generating training data or may be learned through an adaptive training model.

Another example aspect of placing the virtual object in the AR scene can include detecting one or more surfaces depicted in the augmented reality view. For instance, in some implementations it may be advantageous to set a condition for defining the realism of the augmented image. Surface detection can be used to define certain coordinates or areas within the AR scene for placing the virtual object. Generally, realistic photos do not display objects floating in the middle of the air. Instead an object is sitting or leaning on a surface. Using the one or more surfaces, a condition can be defined in some implementations that the seat of any virtual object is placed in contact with one of the surfaces. Alternatively, a condition can be defined in certain implementations that the seat is not in contact with any of the surfaces. In this manner, the realism of certain objects within the augmented image may be modified based on the condition. Further, this information can be included as metadata or associated with the augmented image as a label that can subsequently be used to train a machine learned model to detect altered or less realistic images.

Another example aspect of placing the virtual object in the AR scene can include defining a training task. As an example, using the AR scene combined with a virtual object, the augmented image can be constructed to improve training machine learned models for certain tasks by adjusting how to determine the position and/or the orientation of the virtual object. For instance, in some implementations, the position of the virtual object can be limited such that physical elements in the AR scene block at least some of the virtual object depicted in the augmented image. This can be used to develop machine learned models to detect obstructed objects. Therefore, in some embodiments, positions of one or more physical elements may be determined in the AR scene, followed by one or more virtual models being positioned such that they are partially obscured behind one or more of the physical elements. Alternatively, in some training embodiments, blocked views from objects in the AR scene may be discarded or otherwise removed from the AR scene or the augmented image so that training data can be generated that only includes unobscured views.

Example implementations of the disclosure may further include storing the augmented image as training data within a machine-learning training dataset. The machine-learning training dataset can optionally include additional training data other than synthetic data. For example, real images or real objects placed within AR scenes can be included as additional training data. Aspects of the real images can include labels that can be used for comparing a statistic (e.g., accuracy) determined by a machine learned model trained on synthetic data for performing the trained task on real data.

For certain implementations, the stored augmented image can be associated with a training label for inclusion in the machine learning training dataset. The training label can include information related to the AR scene or associated with the virtual object. Example information can identify the virtual object (e.g., a shoe); indicate the position of the virtual object within the scene (e.g., a coordinate location and/or a bounding box); indicate the orientation of the virtual object within the scene (e.g., a profile or six degree of freedom description); obstruction information that describes obstructions of the virtual object; and/or other information descriptive of the virtual object. Additionally or alternatively, example information may include one or more of: camera angle, lighting, image realism, surface coordinates; depth; visibility; segmentation; and/or other information about the scene.

Advantages and other technical effects related to the disclosure can include faster generation of training data as well as automation of data labeling which together can reduce cost and time associated with training machine learned models. Additionally, the control of virtual models and/or objects can be used to specify certain tasks and more quickly generate relevant data. As yet another example, by producing more realistic synthetic training data, the machine-learned models that are trained on such training data can have improved performance (e.g., improved detection, faster recognition, etc.).

Further, additional applications having the synthetic data generation system and one or more machine learning models included or in communication with example implementations may be used to create feedback for automatically setting and/or adjusting parameters for generating the AR-assisted synthetic data based in part on output from at least one of the one or more machine learning models. This automated feedback and data generation may be used to explore previously unrecognized training tasks that can further advance the field of computer vision.

With reference now to the Figures, example embodiments of the present disclosure will be discussed in further detail.

Example Devices and Systems

FIG. 1 depicts a block diagram of an example computing system 100 for generating synthetic training data according to example embodiments of the present disclosure. The system 100 can include a user computing device 102, a server computing system 130, and a training computing system 150 that can also be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and memory 114. The one or more processors 112 can be, for example, any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the one or more processors 112 to cause the user computing device 102 to perform operations.

In some implementations, the user computing device 102 can store or access one or more synthetic data generation systems 120. For example, the synthetic data generation systems 120 can be or can otherwise include various scanners, augmented reality engines, multi-camera systems, or other similar systems for generating a 3D representation of an object and/or an environment. The 3D representations can provide mesh models or other similar models of surfaces defining external features of the object as well as physical boundaries and/or objects in the environment. Alternatively or additionally, the synthetic data generation systems can include or otherwise access image processing applications configured to work with 3D representations (e.g., by stitching together one or more individual image frames to generate a 3D model). These applications can include features for defining a 3D environment (e.g., by stitching together multiple image frames depicting the environment) as well as modifying the 3D environment to produce an augmented image by placing one or more items within the 3D environment.

As an example, placing a 3D virtual object within the 3D environment can include specifying a position within the 3D environment as well as an orientation for the 3D virtual object. Generating the augmented image can then include modifying one or more image frames that together define the 3D environment to include a view of the 3D virtual object, based at least in part on the position and the orientation. For certain implementations, the augmented image may only include a single frame depicting an area of the 3D environment modified to include the view of the 3D virtual object. Alternatively, for some implementations, the augmented image may include a plurality of frames that together display various views of the 3D virtual object in the scene. Further, certain 3D image processing applications may take the augmented image or data including the augmented image as an input and provide a 3D scene depicting the virtual object within the environment at the specified orientation and position.

In some implementations, the one or more synthetic data generation systems 120 can be received from the server computing system 130 over network 180, stored in the user computing device memory 114, and then used or otherwise implemented by the one or more processors 112. In some implementations, the user computing device 102 can implement multiple parallel instances of a single synthetic data generation system 120 (e.g., to perform image processing, 3D-scanning, or other similar applications in parallel.) These use cases may provide advantages when a large corpus of training data is needed or for certain implementations where synthetic training data is concurrently provided to a machine-learned model to produce a feedback loop based on the quality or another aspect of the synthetic training data.

More particularly, the synthetic data generation system 120 can function to perform operations such as obtaining a three-dimensional model of an object (referred to hereafter as the virtual object) and obtaining data that includes one or more image frames displaying a scene. As previously stated, the synthetic data generation system 120 can also determine a position and an orientation for the virtual object within the scene. In general, the position and the orientation may be determined at random, based on a user selection, and can be determined independently of one or the other. Based at least on the position and the orientation, the synthetic data generation system 120 can generate, using an augmented reality rendering engine, an augmented image that depicts the virtual object within the scene.

For certain implementations, the synthetic data generation system 120 or other instructions 118 included as part of the memory 114 may be executed to store the augmented image as a training image within a machine learning training dataset that can be accessed by a training system 150. The training image can also be associated with a training label that identifies one or more of: the identity of the virtual object (e.g., a shoe), the position of the virtual object (e.g., a coordinate corresponding to a location in the 3D environment), and/or an orientation of the virtual object (e.g., an area of the virtual object, a rotation, a camera pose, or combinations thereof).

The server computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 may include or is otherwise implemented by one or more server computing devices. In instances in which the server computing system 130 includes plural server computing devices, such server computing devices can operate according to sequential computing architectures, parallel computing architectures, or some combination thereof.

As described above for the user computing device 102, the server computing system 130 can store or otherwise include one or more synthetic data generation systems 140. For example, the synthetic data generation systems 140 can be or can otherwise include various image processing engines including augmented reality engines and may also include scanning systems for generating 3D representations of physical objects and/or environments. For certain implementations, the server computing system 130, the user computing device 102, or both can also include a machine learned model. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models via interaction with the training system 150 that is communicatively coupled over the network 180. The training computing system 150 can be separate from the server computing system 130 or can be included as a portion of the server computing system 130.

The training computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 may include or can otherwise be implemented by one or more server computing devices.

The training computing system 150 can include a model trainer 160 that trains the machine-learned models that can be stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

Training the machine learned model can include a variety of techniques and methods. As one example, training can include receiving, as input to the machine learned model, training data from the training dataset, such as an augmented image. The machine learning model can process the input to generate a predicted output. The predicted output may, for example include classifications, locations and/or orientations of one or more objects within the image. Classifications of objects may be determined from a probability distribution over a set of potential classifications. If the training is accomplished using a supervised technique, the output of the machine learned model may be compared to known labels associated with the input training data, such as known classifications, locations and/or orientations of one or more objects within the image. The comparison may, for example, be performed by means of a loss function/objective function. An example of such a loss function for classification tasks is a cross-entropy loss, though other loss functions may alternatively be used. Based on the comparison, the machine learned model may be updated. For example, if the machine learning model is a neural network, weights and biases in the network may be updated using an optimization procedure, such as gradient descent. The training process may be iterated until a threshold condition is met, such as a threshold number of iterations or a threshold accuracy on a test dataset being reached.

In particular, the model trainer 160 can train the machine learned models based on a set of training data 162. The training data 162 can include, for example, synthetic datasets that include one or more augmented images produced using the one or more synthetic data generation systems 120 and 140. Example advantages of computing systems according to the present disclosure, as exemplified in FIG. 1, can include the automated generation of labeled data. For instance, attributes of the augmented images such as environmental metadata or other information associated with the virtual environment may be included as training labels associated with the training image in the machine learning training dataset. Additionally or alternatively, further attributes such as object metadata or other information associated with the virtual object can also be included as training labels associated with the training image in the machine learning training dataset. Since these labels can be related to aspects of the augmented image and/or aspects of generating the augmented image, each label can be generated automatically without the need for review by an expert. This can lead to reduced costs and an increased scale at which example implementations can produce synthetic data.

The model trainer 160 can include computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the machine-learned models can be both trained and used locally at the user computing device 102.

As disclosed, the user computing device 102 and/or the server computing system 130 can include a number of applications (e.g., applications 1 through N). Each application can contain include an application programming interface (API) for accessing one or more operations performed by the application (e.g., image display, image processing, augmented reality engines, camera applications, file or data transmission, wireless communication or connection etc.) For example, in some implementations each application can communicate with one or more other components of the computing device, such as, for example, one or more sensors, a context manager, a device state component, and/or additional components. In certain implementations, each application can communicate with each device component using an API (e.g., a public API). In some implementations, the API used by each application is specific to that application.

Example Methods

Figure 2:
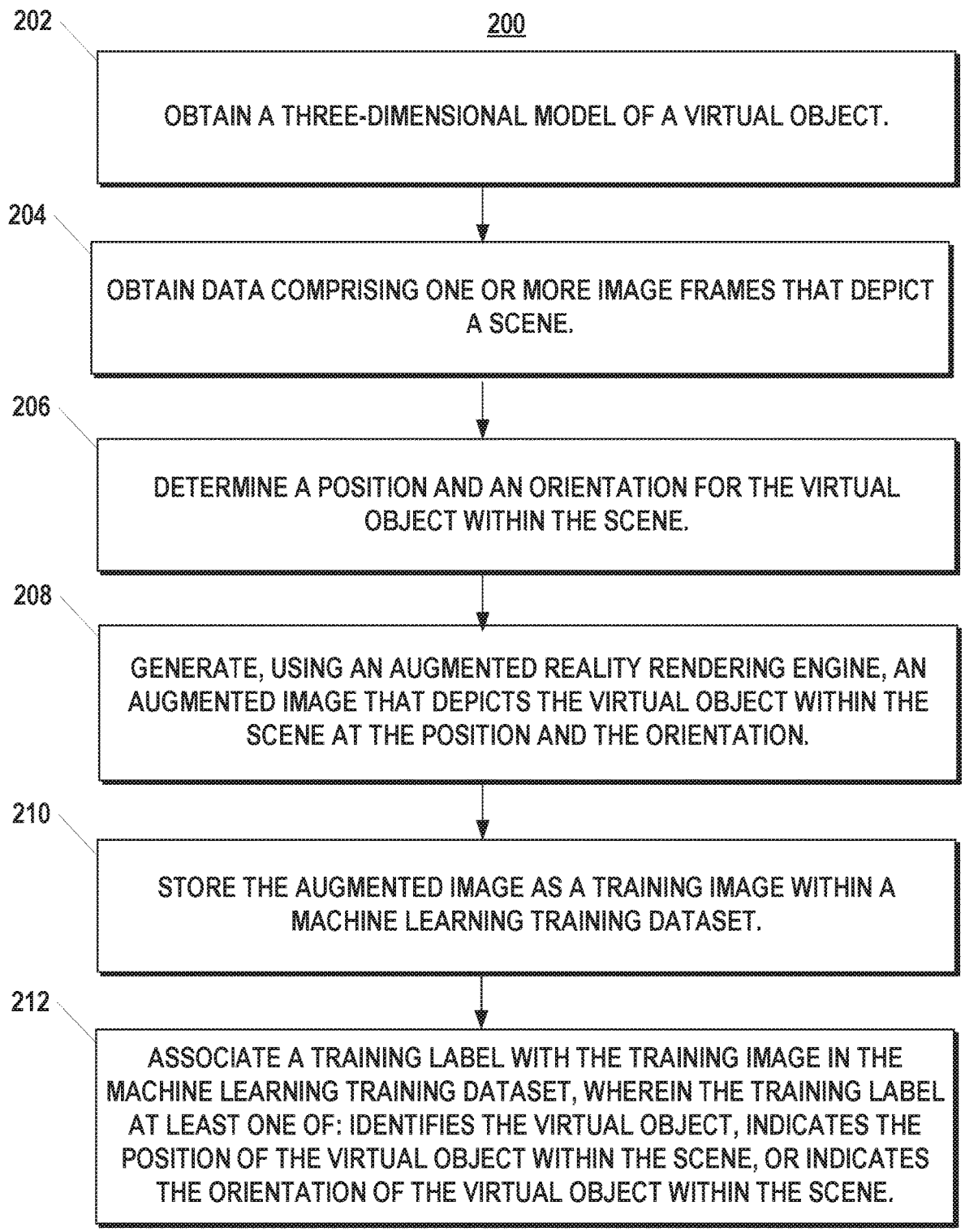
FIG. 2 depicts a block diagram of an example method for generating synthetic data according to example embodiments of the present disclosure.

FIG. 2 depicts a flow chart diagram of an example method for generating training data according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can obtain a three-dimensional model of a virtual object. In general, obtaining the three-dimensional model of the virtual object can include constructing the virtual object from multiple images, at varying positions and/or angles of the object. Alternatively, three-dimensional model datasets that have been produced using similar techniques may be accessed (e.g., by transmitting said datasets to example implementations). The three-dimensional model datasets can be publicly available or privately maintained and obtaining the datasets can be accomplished using hardwired connections or physical media. Alternatively, the datasets can be received using wireless connections such as over the internet or Bluetooth. For example computing systems, file(s) encoding the virtual object can be stored locally on memory or may be accessed remotely without the need to copy or transfer the file(s).

At 204, the computing system can obtain data comprising one or more image frames that depict a scene. In some implementations, the computing system can obtain data comprising one or more image frames using a device to capture one or more video sequences of a scene (e.g., a session). In some cases, the device can include a personal device such as a smartphone that includes an AR engine configured for AR generation (e.g., ARKit or ARCore). In certain cases, the device can be connected to a plurality of cameras to capture different views of a scene at substantially the same time or in a sequence. The AR engine can be configured to estimate features and planes with 3D coordinates, as well as lighting of the scene. Similarly to obtaining the three-dimensional model 202, obtaining data comprising one or more image frames 204 can include accessing stored data or files that are publicly available or privately maintained using hardwired and/or wireless connections. Thus, while shown as two different steps in FIG. 2, it should be understood that obtaining the three-dimensional model 202 and the data comprising one or more image frames 204 may be performed in parallel or combined into a single operation (e.g., by associating or combining the three-dimensional model with the data comprising one or more image frames, by collecting imagery of the object and image frames of the scene at substantially the same time, etc.)

At 206, the computing system can determine a position and an orientation for the virtual object within the scene. In an example implementation, determining the position and the orientation can include accessing information associated with the one or more image frames such as a 3D mesh defining the location of physical objects or surfaces within the image frame, a depth map for transforming locations in a two-dimensional image frame to three-dimensional coordinates, and/or a visibility map. In certain implementations, the position and or the orientation can include substantially any coordinate location in the scene or image frame or any orientation of the virtual object. For some implementations, improved simulated data quality or data realism can be achieved by limiting the position to certain coordinate locations such that the position of the virtual object is determined based on locations in contact with a surface of the scene (e.g., by identifying surfaces based on the mesh map). Determining the position of the virtual object can also include generating a reference frame (e.g., a coordinate frame) for the virtual object defining one or more axes. The one or more axes can provide translational and rotational definitions so that the reference frame for the virtual object can be mapped to a location in the scene at a coordinate position based on the one or more axes and rotated along the one or more axes to determine the orientation. As another example, the virtual object may define one or more seats indicating possible planar boundaries for placing the virtual object in the scene. Determining the position and the orientation can then include identifying a substantially planar surface in the scene (e.g., a table or other surface normal to gravity) and placing the virtual object in the scene so that the seat of the virtual object is in contact with the substantially planar surface. The orientation can be determined by rotating the virtual object along an axis normal to the seat in contact with the substantially planar surface.

At 208, the computing system can generate, using an augmented reality rendering engine, an augmented image that depicts the virtual object within the scene at the position and the orientation. For generating the augmented image, example computing systems according to the present disclosure can include logic or other instructions for determine the position and the orientation according to 206. For instance, one aspect of generating the augmented image can include defining a training task. As an example, various augmented images can be constructed to improve training machine learned models for certain tasks by adjusting how to determine the position of the virtual object. For instance, in some implementations, the position of the virtual object can be limited such that physical elements in the AR scene block at least some of the virtual object in one of the AR scene views. This can be used to improve training models to detect obstructed objects. Alternatively, in some training embodiments, blocked views from objects in the AR scene may be discarded or otherwise removed from the AR scene or the augmented image so that training data can be generated that only includes unobscured views.

Further, while exemplified throughout the present disclosure as generating an augmented image depicting the virtual object within the scene, it should be understood that one or more virtual objects may be included in augmented images according to the present disclosure. For example, AR engines may have access to datasets including one or more virtual objects that may each have various sizes, shapes or other properties. Example systems and methods can determine a position and an orientation for one or more virtual objects included in the dataset to generate augmented images displaying the AR scene with multiple virtual objects. This may provide advances for generating training data for highly dense navigation scenarios such as object detection and avoidance in traffic.

At 210, the computing system can store the augmented image as a training image within a machine learning training dataset. For certain implementations, the machine-learning training dataset can include additional training data other than synthetic data. For example, real images or real objects placed within AR scenes can be included as additional training data. Aspects of the real images can include labels that can be used for comparing a statistic (e.g., accuracy) determined by a machine learned model trained on synthetic data for performing the trained task on real data. In some implementations, storing the augmented image as a training image can include processing the augmented image (e.g., to generate an embedding or a normalized representation) to generate the training image. Thus the training image need not include an image file and can include other data representations derived from the augmented image.

At 212, the computing system can associate a training label with the training image in the machine learning training dataset, the training label indicating at least one of: identifies the virtual object, indicates the position of the virtual object within the scene, or indicates the orientation of the virtual object within the scene. For certain implementations, the training label may include other attributes of the training image such as associating a label based on the task defined for generating the augmented image. Other training labels can include labeling the data as synthetic (e.g., computer-generated). The additional training labels (e.g., synthetic) may be used for feedback such as training a machine-learned model to determine parameters for generating more photo-realistic synthetic images by classifying one or more augmented images produced according to the present disclosure. In some implementations, associating the training label can include generating a separate file that is indexed or otherwise linked to the training image. Additionally, since the training image can be encoded in various data representations, associating the training label can include modifying the training image to include the label or labels.

Aspects of Augmented Images and Example Synthetic Data

Figure 3B:
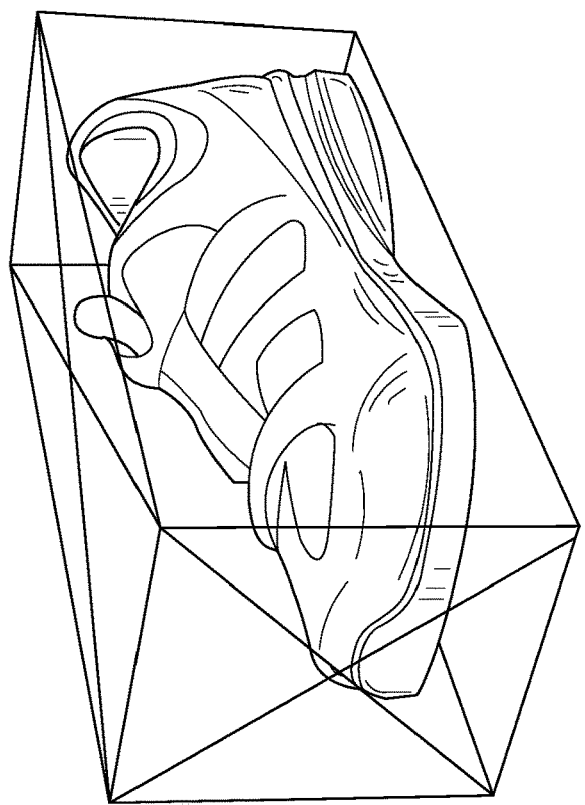
FIGS. 3A and 3B depict example illustrations of a virtual object defining multiple seats which together form a bounding box according to example aspects of embodiments of the present disclosure.
Figure 3A:
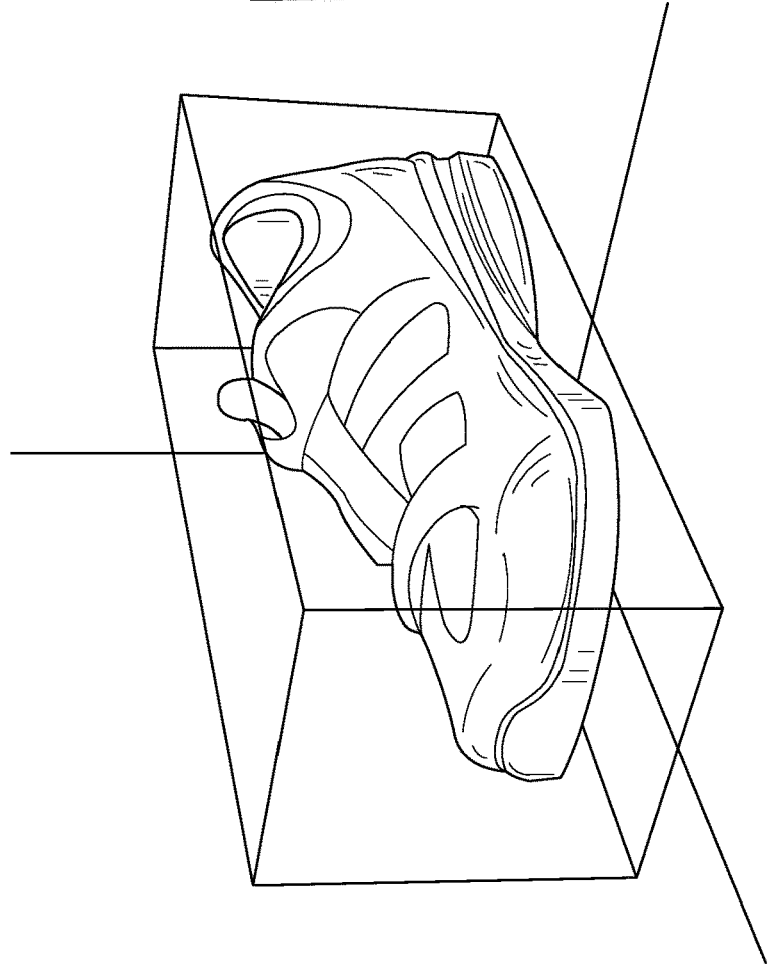

FIGS. 3A and 3B depicts aspects of example virtual objects that can be used to produce an augmented image according to the present disclosure. As shown in the figures, the virtual object can include visual features that substantially represent the physical object used to produce the virtual object. For example, surface features of a shoe can include the laces, sole, and body. Though not shown, additional features such as coloring can also be associated with one or more regions of the virtual object. Additionally or alternatively, the virtual object can be associated with the metadata or referenced to information that is not necessarily displayed in the augmented image. For example, one or more seats defining external boundaries of the virtual object can be included. In some implementations, the one or more seats can comprise a bounding box having 6 planar surfaces that together define a top, bottom, front, back, left, and right of the virtual object. For certain implementations, the seats can be defined such that only some of the seats can be in contact with the virtual environment (e.g., a planar surface/seat having an "x" may be excluded from contact with the virtual environment. Alternatively or additionally, the virtual object can be associated with a coordinate frame such as a 3-dimensional coordinate frame having an x-y-z-axes. For instance, FIG. 3A displays three axes normal to one another. Though not limited to such reference frames, the axes and/or the seats may serve as one possible reference frame for determining the orientation and/or the position according to example implementations of the present disclosure.

Figure 4:
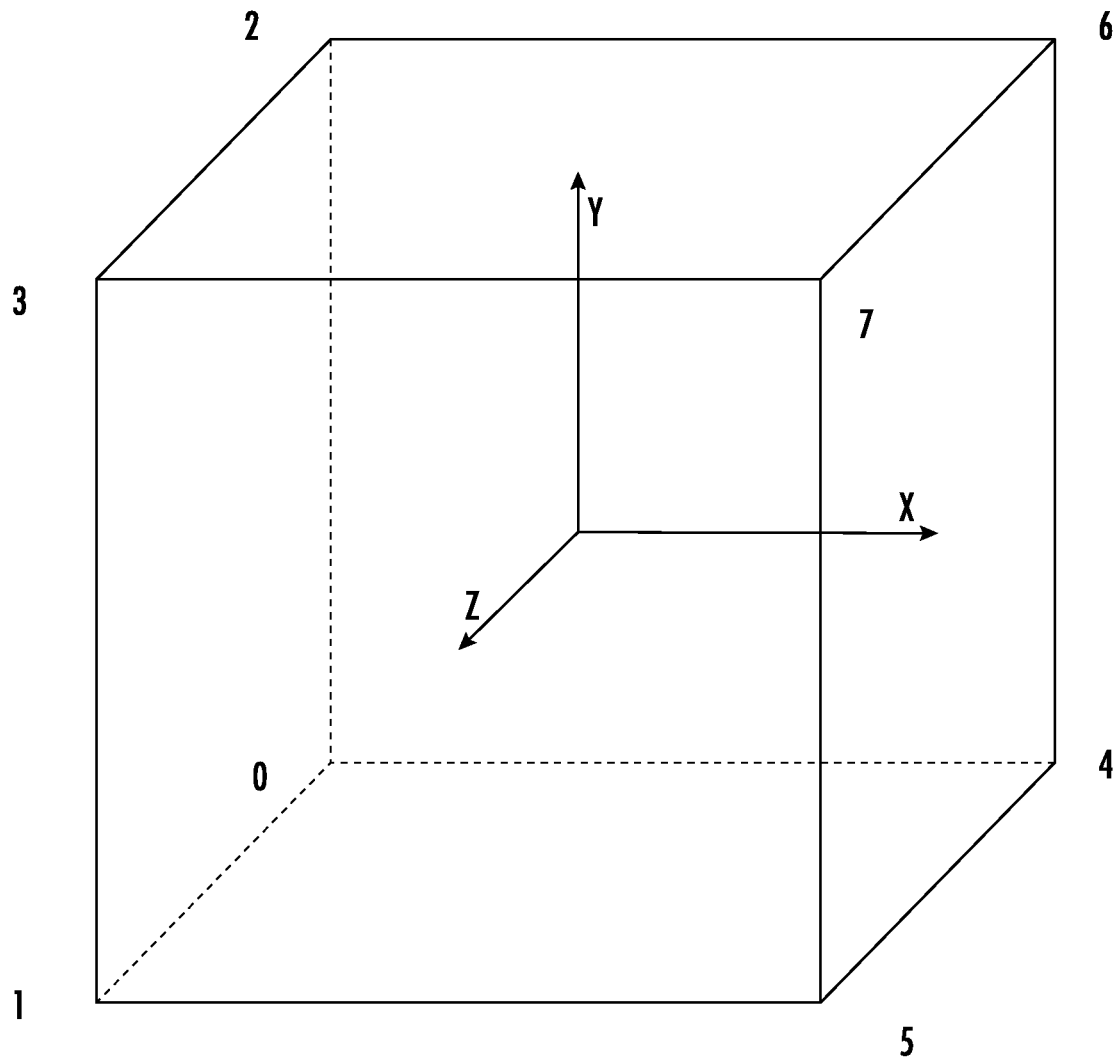
FIG. 4 depicts an example virtual coordinate frame that can be used to define aspects, such as coordinate locations, of example embodiments according to the present disclosure.

FIG. 4 depicts an example reference frame for determining the orientation and/or the position. Though illustrated as a rectangular prism having 8 vertices and 6 faces, it should be understood that the number of vertices and faces may be greater or less than the number depicted. Further, some, all, or none of the information associated with the reference frame may be included as one or more training labels that are associated with the training image.

Figure 5:
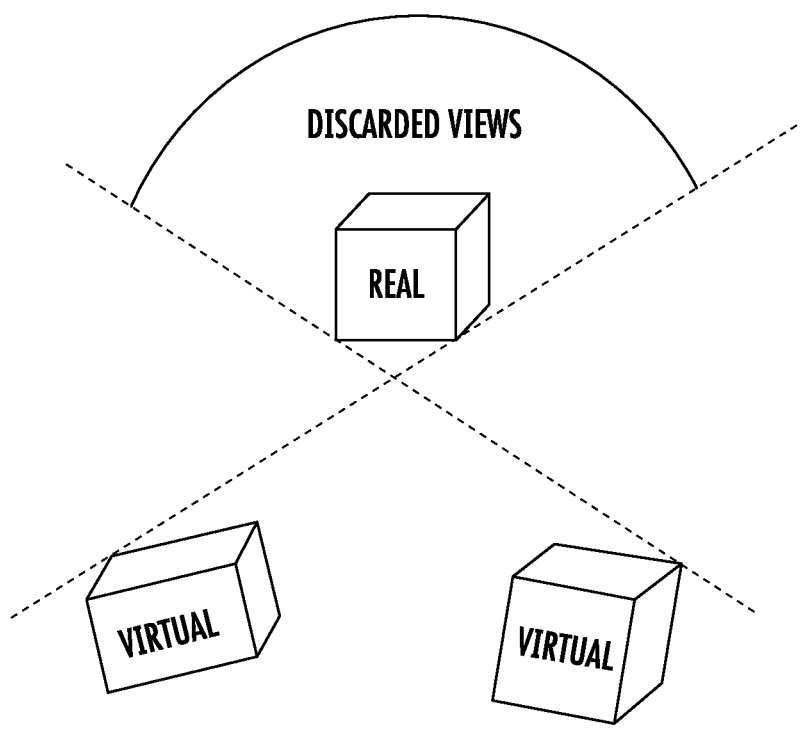
FIG. 5 depicts an example illustration demonstrating how perspective information such as camera pose may be used in some implementations to limit or discard certain views from the AR scene or the augmented image according to example embodiments of the present disclosure.

FIG. 5 depicts an example aspect for certain augmented images and methods for producing synthetic data in accordance with the present disclosure. In some example implementations, the presence of physical objects within the scene can be used to streamline generating training data by discarding views and/or positions that are blocked by the physical object. In this manner, generating synthetic training data can be improved by reducing the number of instances where a user or automated (e.g., random) selection would place the virtual object in a region of the augmented image that would be blocked. For example, while the augmented image can include a 3-dimensional representation including a plurality of image frames, in some instances, it may reduce CPU usage and/or energy costs to utilize some of the image frames depicting the scenes. Since each image frame can be taken from various positions and/or angles, this information can be used to generate augmented images that do not include a blocked view of the virtual object (e.g., by placing the virtual object at a position based at least on the location of a physical object in the scene and/or the camera position). While the virtual object represents a 3-dimensional form, augmented images can include 2-dimensional image frames that have a perspective based in part on the camera position. For such implementations, the camera position and or physical/real object in the scene may be used to discard certain positions or orientations for placing the virtual object in the scene.

Figure 6A:
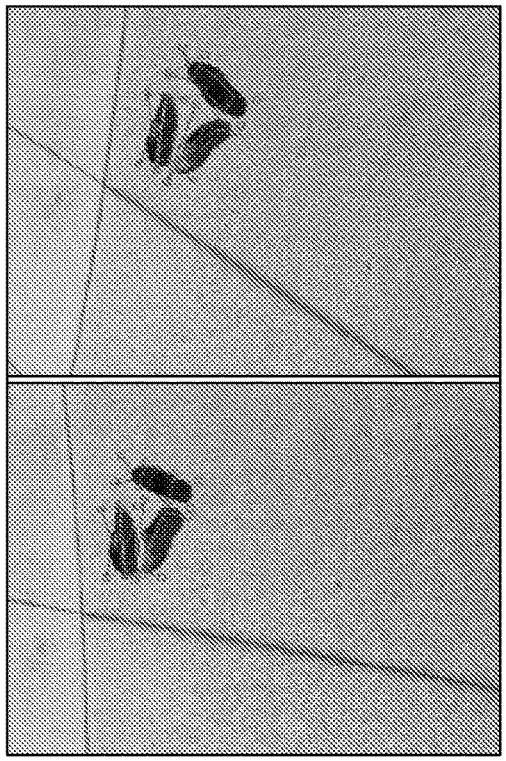
FIG. 6A depicts example augmented images generated according to example embodiments of the present disclosure.
Figure 6B:
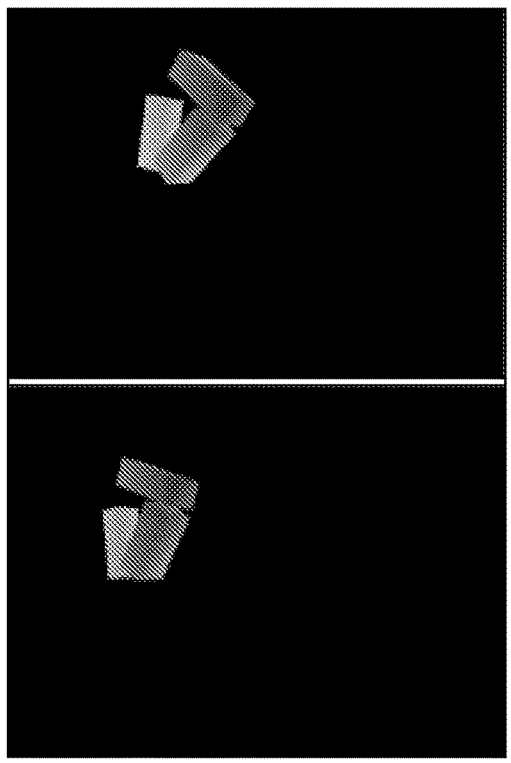
FIGS. 6B-6D further illustrate features such as metadata that can be associated with the augmented images of FIG. 6A. Specifically.

FIGS. 6A and 6B display aspects of example augmented images generated according to example implementations of the present disclosure. In FIG. 6A, two example augmented images are provided displaying three virtual shoes having different positions and orientations. Bothe the left image and the right display the same scene at different camera positions. In FIG. 6B, the same augmented images in FIG. 6A are shown to further include data such as the seats, bounding boxes, and/or coordinate locations. While these elements are depicted in FIG. 6B, it should be understood that the data may be otherwise associated with the images, including in a separate label file. Thus the images themselves need not display the seats bounding boxes, coordinate locations or other associated data that can be used to label the augmented image.

For some implementations in accordance with the present disclosure, associating a training label with the training image (e.g., an augmented image) can include generating, for all or a portion of the image frames included in the augmented image, one or more labels providing, three-dimensional coordinates of bounding box vertices in the camera frame, the corresponding 2D coordinates in an image frame, a projection matrix, and a view matrix. Aspects of the projection matrix and the view matrix can be used to determine a camera pose describing in part the camera position and/or orientation.

Figure 6C:
Figure 6D:
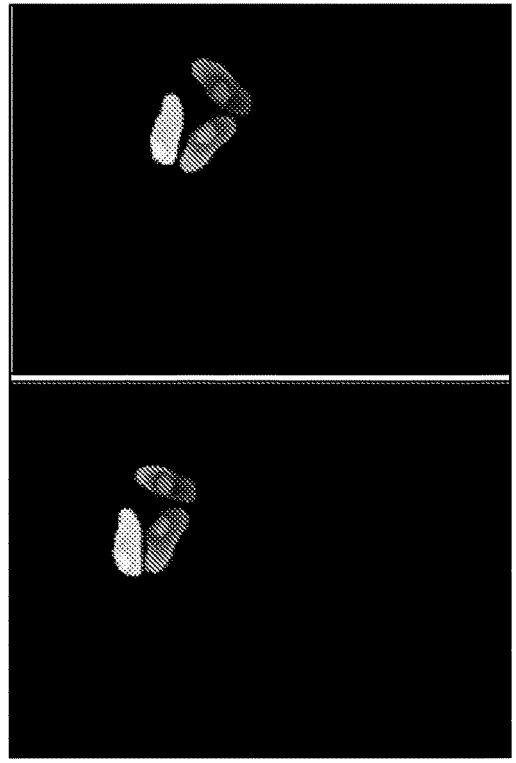

FIGS. 6C and 6D display further aspects of certain example training data. For example, in some implementations, the depth of the virtual object in the scene can be determined by the AR engine. For example, FIG. 6C illustrates the depth information using a normalized grayscale image. In certain implementations, the depth of virtual objects within a scene can also be combined with the position, the orientation, or other information such as a bounding box to determine the virtual object/bounding box depth map, as well as an approximate projected area. Since the projected area is in part a function of the volume of the virtual object various image processing techniques can be used to determine the projected area. From this information further metrics such as visibility of the virtual object in the augmented image can be determined (e.g., visibility =# visible pixels/projected area).

Figure 7A:
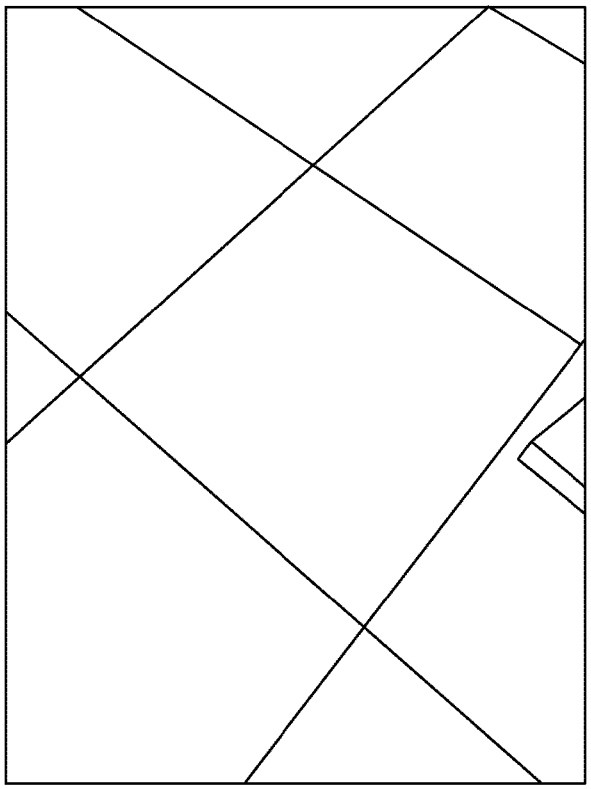
FIGS. 7A-7F depict example augmented images generated according to example embodiments of the present disclosure. These images display the same AR scene including various virtual objects such as boxes (7A, 7B, and 7E) and shoes (7C, 7D, and 7F).
Figure 7C:
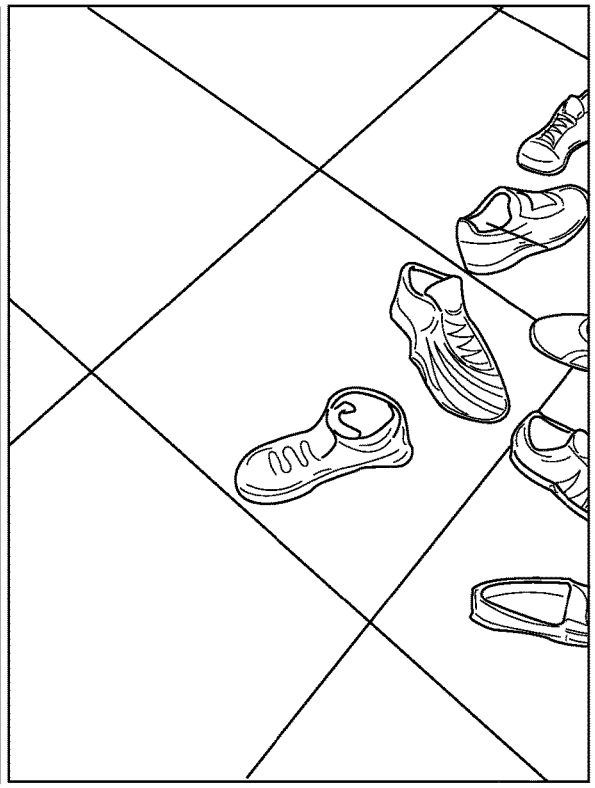
Figure 7B:
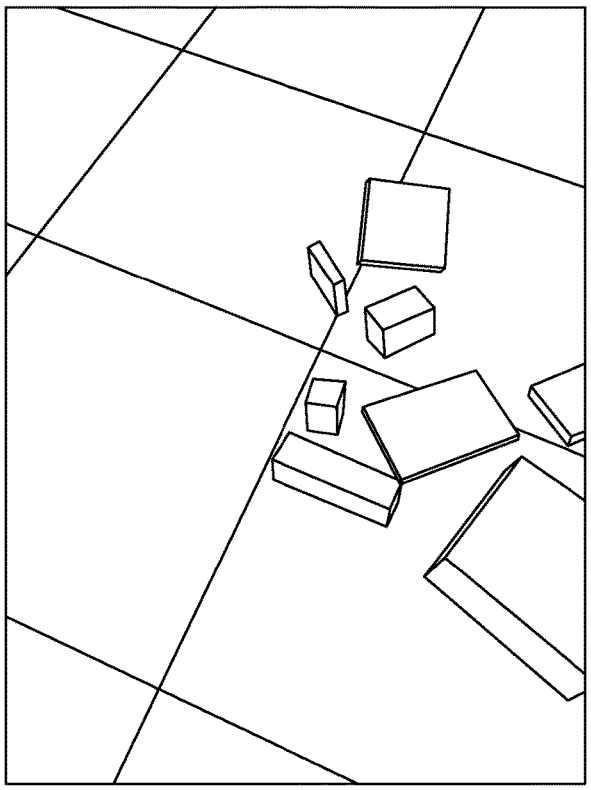
Figure 7D:
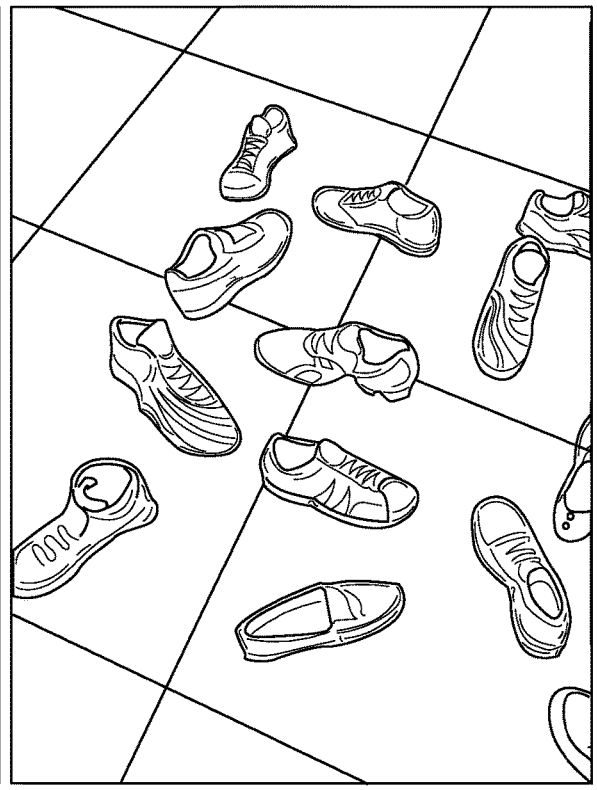
Figure 7E:
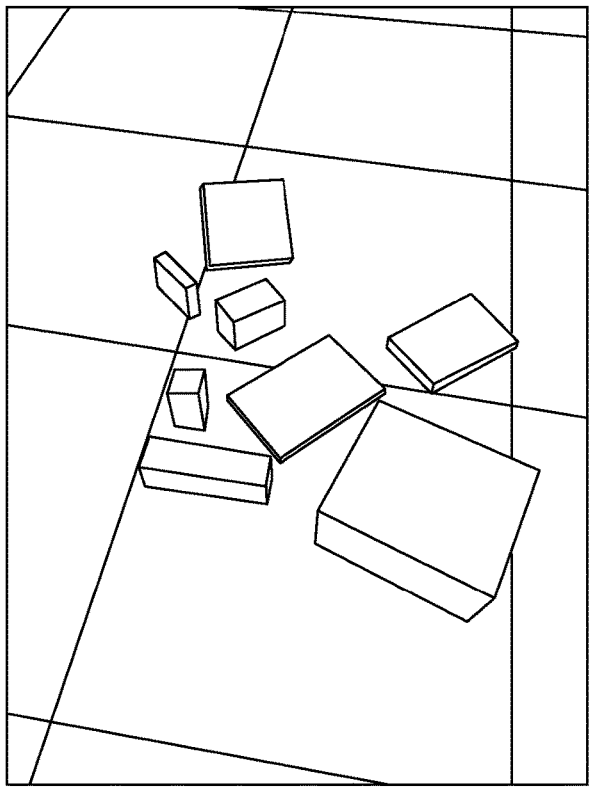
Figure 7F:
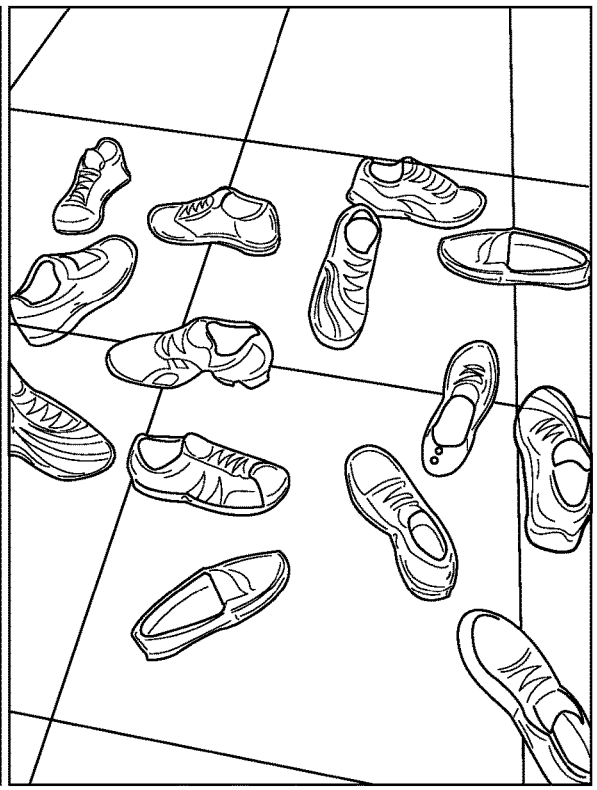

FIGS. 7A-7F display example synthetic data including augmented images displaying a virtual object within a scene. FIGS. 7A, 7B and 7E display images of a scene having one or more virtual boxes of varying sizes placed in the scene. FIGS. 7C, 7D and 7F display images of a scene having one or more virtual shoes placed in the scene. As should be understood, the examples of virtual boxes and virtual shoes are provided as example of virtual objects and are not intended to limit the scope or types of virtual objects that can be used to produce augmented images.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating training data, the method comprising:
    obtaining, by one or more computing devices, a three-dimensional model of a virtual object having one or more contact seats;
    obtaining, by the one or more computing devices, data comprising one or more image frames that depict a scene;
    detecting, by the one or more processors, one or more planar surfaces included in the scene, wherein the one or more planar surfaces each provide a substantially planar area normal to gravity;
    determining, by the one or more computing devices, a position and an orientation for one of the contact seats of the virtual object within the scene to be in contact with at least one planar surface;
    generating, by the one or more computing devices and using an augmented reality rendering engine, an augmented image that depicts the virtual object within the scene at the position and the orientation;
    storing, by the one or more computing devices, the augmented image as a training image within a machine learning training dataset; and
    associating, by the one or more computing devices, a training label with the training image in the machine learning training dataset, wherein the training label at least: identifies the virtual object, or indicates the position of the virtual object within the scene, or indicates the orientation of the virtual object within the scene.

2. The computer-implemented method of claim 1, further comprising:
    training, by the one or more computing devices, a machine-learned model on the machine learning training dataset including the training image and the training label.

3. The computer-implemented method of claim 1, wherein determining the position and orientation comprises:
    determining, by the one or more computing devices, the orientation by rotating the three-dimensional model normal to the selected contact seat; and
    determining, by the one or more computing devices, the position by placing the contact seat in contact with a coordinate location in the augmented image.

4. The computer-implemented method of claim 3,
    wherein an augmented reality rendering engine generates a three-dimensional representation of the scene having a plurality of coordinate locations for the one or more surfaces in the scene.

5. The computer implemented method of claim 4, wherein determining, by the one or more computing devices, the position comprises:
    selecting, by the one or more computing devices, the coordinate location in the augmented reality view corresponding to at least one of the one or more surfaces, and wherein
    generating, by the one or more computing devices, the augmented image comprises placing, by the one or more computing devices, said one contact seat of the virtual object in contact with the at least one of the one or more surfaces.

6. The computer-implemented method of claim 3, wherein associating, by the one or more computing devices, the training label with the training image in the machine learning training dataset comprises:
    defining, by the one or more computing devices, a bounding box within the training image based at least in part on one or both of: the one or more contact seats of the virtual object and the position of the virtual object.

7. The computer-implemented method of claim 3, wherein the one or more contact seats comprise 1 to 10 planar boundaries of the virtual object.

8. The computer-implemented method of claim 1, wherein associating, by the one or more computing devices, the label with the training image comprises storing, by the one or more computing devices, the label as metadata for the training image.

9. The computer-implemented method of claim 1, wherein the machine-learned model includes a neural network.

10. The computer-implemented method of claim 2, wherein training, by the one or more computing devices, the machine-learned model comprises performing, by the one or more computing devices, a supervised training technique that utilizes a ground truth signal that comprises the training label associated with the augmented image.

11. The computer-implemented method of claim 1, wherein the one or more image frames further comprise environmental metadata including one or more of: a position of one or more light sources, a position of one or more cameras, an orientation of the one or more light sources, and an orientation of the one or more cameras.

12. The computer-implemented method of claim 1, wherein determining, by the one or more computing devices, the position and the orientation for the virtual object comprises:
    obtaining, by the one or more computing devices, a user input defining the position and the orientation for the virtual object.

13. The computer-implemented method of claim 1, wherein determining the position and the orientation for the virtual object within the scene comprises:
    generating, by the one or more computing devices, a random value; and
    setting, by the one or more computing devices and based at least in part on the random value, the position for the virtual object, the orientation for the virtual object, or both.

14. A computing system comprising:
    one or more processors; and
    one or more non-transitory computer-readable media that collectively store instructions that, when executed by the one or more processors, cause the one or more processors to perform operations, the operations comprising:
obtaining a three-dimensional model of a virtual object having one or more contact seats;
obtaining data comprising one or more image frames that depict a scene;
detecting, by the one or more processors, one or more planar surfaces included in the scene, wherein the one or more planar surfaces each provide a substantially planar area normal to gravity;
determining a position and an orientation for one of the contact seats of the virtual object within the scene to be in contact with at least one planar surface;
generating, using an augmented reality rendering engine, an augmented image that depicts the virtual object within the scene at the position and the orientation;
storing the augmented image as a training image within a machine learning training dataset; and
associating a training label with the training image in the machine learning training dataset, wherein the training label at least one of: identifies the virtual object, indicates the position of the virtual object within the scene, or indicates the orientation of the virtual object within the scene.

15. The computing system of claim 14, the operations further comprising:
training a machine-learned model on the machine learning training dataset including the training image and the training label.

16. The computing system of claim 14, wherein determining the position and orientation comprises:
determining one or more contact seats that represent possible planar boundaries surrounding exterior regions of the virtual object for positioning the virtual object in an augmented reality view of the scene;
selecting one of the contact seats;
determining the orientation by rotating the three-dimensional model normal to the selected contact seat; and
determining the position by placing the contact seat in contact with a coordinate location in the augmented image.

17. The computing system of claim 16, wherein associating the training label with the training image in the machine learning training dataset comprises:
defining a bounding box within the training image based at least in part on one or both of:
the one or more contact seats of the virtual object and the position of the virtual object.

18. The computing system of claim 14, wherein associating, by the one or more computing devices, the label with the training image comprises storing the label as metadata for the training image.

19. One or more non-transitory computer-readable media that store instructions that, when executed by one or more processors, cause the one or more processors to perform operations, the operations comprising:
obtaining a three-dimensional model of a virtual object having one or more non-contact seats;
obtaining data comprising one or more image frames that depict a scene;
detecting, by the one or more processors, one or more planar surfaces included in the scene, wherein the one or more planar surfaces each provide a substantially planar area normal to gravity;
determining a position and an orientation for the virtual object within the scene, the position and orientation including preventing any non-contact seat from contacting any planar surface;
generating, using an augmented reality rendering engine, an augmented image that depicts the virtual object within the scene at the position and the orientation;
storing the augmented image as a training image within a machine learning training dataset; and
associating a training label with the training image in the machine learning training dataset, wherein the training label at least: identifies the virtual object, or indicates the position of the virtual object within the scene, or indicates the orientation of the virtual object within the scene.

20. The non-transitory computer-readable media of claim 19, the operations further comprising: training a machine-learned model on the machine learning training dataset including the training image and the training label.

* * * * *